June 28, 1927. T. H. THOMAS Re. 16,663
TRAIN CONTROL DEVICE
Original Filed March 24, 1924
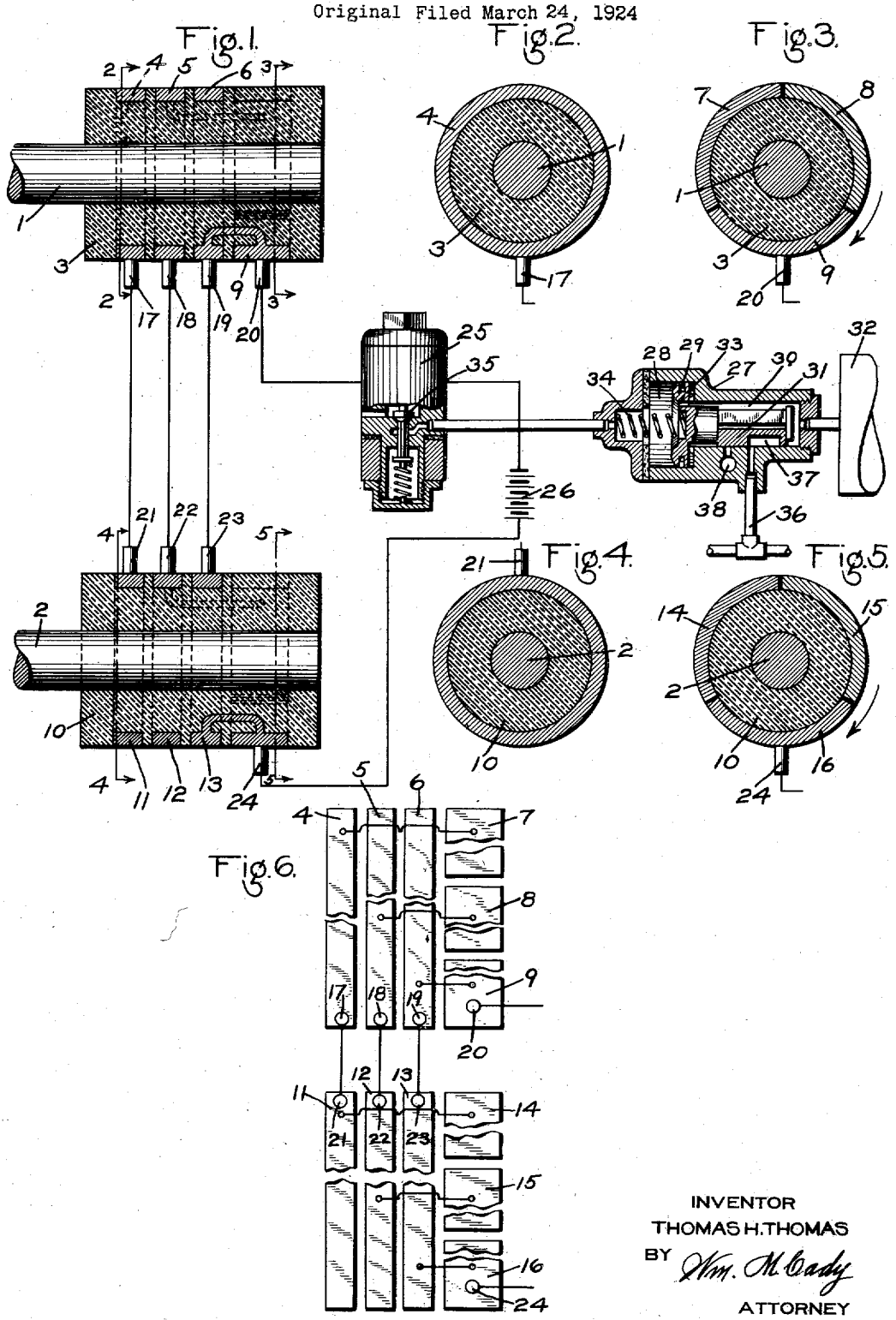
INVENTOR
THOMAS H. THOMAS
BY Wm. M. Cady
ATTORNEY Reissued June 28, 1927. Re. 16,663

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

TRAIN-CONTROL DEVICE.

Original No. 1,569,155, dated January 12, 1926, Serial No. 701,377, filed March 24, 1924. Application for reissue filed March 7, 1927. Serial No. 173,504.

This invention relates to automatic train control systems, and more particularly to those in which the speed of the train is controlled in accordance with the signal indication.

With a train speed control equipment, a centrifugal governor is usually employed, which is responsive to the speed of the train for controlling apparatus by which the speed of the train is limited.

If the speed governor should fail, as by the breaking of the governor shaft, for example, then the speed control apparatus would fail to function as intended.

The principal object of my invention is to provide means operative upon failure of the speed governor for reducing the speed of the train.

In the accompanying drawing: Fig. 1 is a diagrammatic view of mechanism for limiting the speed of the train, in case of failure of the speed governor, in accordance with my invention; Fig. 2 a section on the line 2—2 of Fig. 1; Fig. 3 a section on the line 3—3 of Fig. 1; Fig. 4 a section on the line 4—4 of Fig. 1; Fig. 5 a section on the line 5—5 of Fig. 1; and Fig. 6 a developed view of the contact segments of the contact drums shown in Fig. 1.

As shown in Fig. 1, the shaft 1 is operatively connected so as to rotate when the speed governor (not shown) of the speed control apparatus rotates, while the shaft 2 is operatively connected so as to rotate when the locomotive axle, or other rotating part of the locomotive, rotates.

Applied to the shaft 1 is a drum 3 of insulating material and carried by said drum are continuous contact rings 4, 5, and 6, and alined contact segments 7, 8, and 9, the contact rings 4, 5, and 6 being electrically connected to the respective contact segments 7, 8, and 9.

Applied to shaft 2 is a drum 10 of insulating material and carried by said drum are continuous contact rings 11, 12, and 13, and alined contact segments 14, 15, and 16, which are electrically connected to the respective contact rings 11, 12, and 13.

Contact fingers 17, 18, and 19 engage the respective contact rings 4, 5, and 6 and contact finger 20 engages the contact segments 7, 8, and 9. Contact fingers 21, 22, and 23 engage the contact rings 11, 12, and 13 and contact finger 24 engages the contact segments 14, 15, and 16. The contact fingers 17, 18, and 19 are electrically connected to the respective contact fingers 21, 22, and 23 and the contact finger 20 is connected to one terminal of an electro-magnet 25. The contact finger 24 is connected to a source of current 26 which is in circuit with the magnet 25.

A brake application valve device 27 is provided, which may be the usual brake application valve device of the train speed control equipment and said valve device may comprise a casing having a piston chamber 28 containing a piston 29 and a valve chamber 30 containing a slide valve 31 adapted to be operated by piston 29.

The valve chamber 30 is connected to a source of fluid under pressure, such as the reservoir 32 and fluid equalizes from chamber 30 through a restricted port 33 into piston chamber 28. With the fluid pressures equalized on opposite sides of piston 29, the spring 34 maintains the piston 29 in release position, as shown in Fig. 1.

The magnet 25 controls a valve 35 and when the magnet is deenergized, the valve 35 is unseated, so that fluid under pressure will be vented from piston chamber 28.

The shaft 1 which rotates when the speed governor shaft rotates and the shaft 2 which rotates when the locomotive axle rotates are so geared that both shafts rotate at the same speed and the contact drums 3 and 10 are so positioned that the contact finger 20 will successively engage the contact segments 9, 8, and 7 at the same time that the contact finger 24 successively engages the contact segments 16, 15, and 14 when the drums 3 and 10 are rotated at the same speed and in the same direction.

Taking the position shown in Fig. 1, the contact finger 20 engages the contact segment 9, while contact finger 24 engages the segment 16 and by reference to Fig. 6, it will be clear that a circuit is completed through the magnet 25 and the source of current 26 as follows: from contact finger 20 to segment 9, to contact ring 6, to contact ring 13, to contact segment 16, to contact finger 24, and thence through the source of current 26 and magnet 25 to contact finger 20. As the drums 3 and 10 rotate, as indicated by the arrows in Figs. 3 and 5, the contact fingers 20 and 24 pass from the respective segments 9 and 16 to the segments 8 and 15. The circuit is now traced from finger 20, through contact segment 8, ring 5, ring 12, and segment 15, to finger 24. In the same way, when the fingers 20 and 24 pass to the segments 7 and 14, the circuit is completed from finger 20, through contact segment 7, ring 4, ring 11, and segment 14 to finger 24.

It will thus be seen that so long as the shafts 1 and 2 and the drums 3 and 10 rotate in synchronism, the circuit of the magnet 25 will be maintained and said magnet will remain energized, and so long as the magnet 25 is energized, the valve 35 is held seated and no action takes place.

If, however, the shaft 1 should cease rotating, while the shaft 2, rotating with the locomotive axle, continues to rotate, then as soon as the rotating drum 10 has rotated so that the contact finger 24 passes out of engagement with the contact segment corresponding with the contact segment with which the finger 20 engages, the magnet circuit will be broken. For example, assume that the drum 3 ceases to rotate while the contact finger 20 engages the segment 9, then the drum 10, continuing to rotate, causes the contact segment 16 to move out of engagement with the contact finger 24, and thus open the magnet circuit.

When the magnet 25 becomes deenergized by the opening of the magnet circuit, the valve 35 will be unseated, so that fluid will be vented from the piston chamber 28. The piston 29 is then operated and the slide valve 31 is shifted to connect the usual train brake pipe 36 through cavity 37 with an exhaust port 38. Fluid under pressure is consequently vented from the brake pipe to effect an application of the brakes in the usual manner.

It is possible that the drum 3 may cease rotating when the contact finger 20 happens to bridge adjacent contact segments, and if each drum were only provided with two contact segments and two contact rings, the circuit would not be broken by the continual rotation of the drum 10, since the circuit would be maintained through either one or the other of the two contact segments on the drum 3, both of the segments being connected to the finger 20.

For the above reason, it is preferable to provide three or more contact segments on each drum, so that there will always be a segment which is not connected to the finger 20 in case the drum 3 ceases to rotate.

Having now described my invention, what I claim as new and desire to secure by Letters Patent, is:—

1. In an electric circuit controlling mechanism, the combination with two rotating elements, each carrying a plurality of contact segments, of a contact engaging the contact segments of each rotating element and adapted to maintain an electric circuit closed so long as said elements rotate in synchronism, the circuit being opened upon failure of one element to rotate.

2. In an electric circuit controlling mechanism, the combination with two rotating elements, each carrying a plurality of contact segments, of a contact engaging the contact segments of each rotating element and adapted to maintain an electric circuit closed so long as said elements rotate in synchronism, the circuit being opened by the continued rotation of one element upon failure of the other element to rotate.

3. In an electric circuit controlling mechanism, the combination with two rotating elements, of a plurality of contact segments movable with each element, a contact finger engaging the contact segments of each element and adapted to maintain an electric circuit closed so long as said elements rotate in synchronism, the circuit being opened upon failure of one element to rotate.

4. In an electric circuit controlling mechanism, the combination with two rotating elements, of a plurality of contact segments movable with each element, means for connecting each contact segment of one element with a contact segment of the other element, a contact finger engaging the contact segments of each element and adapted to maintain an electric circuit closed when said elements rotate in synchronism, the circuit being opened upon failure of one element to rotate.

5. In an electric circuit controlling device, the combination with two synchronously rotatable elements, of a plurality of contact members carried by one element, contact members carried by the other element and each electrically connected to a corresponding contact member of the first rotatable element, and a contact finger adapted to engage the contact members of each rotatable element, said fingers being positioned to engage corresponding connected contact members and continuously maintain an electric circuit closed, so long as said elements rotate in synchronism.

6. In a train control apparatus, the combination with electrically controlled means operating upon deenergization to effect an application of the brakes, of two rotating elements, contact segments carried by and movable with such element, a contact finger engaging the contact segments of each rotating element and adapted to maintain the circuit of said means closed when both elements rotate in synchronism, said circuit being opened upon failure of one element to rotate.

7. In a train control apparatus, the combination with a brake application valve device operating upon a reduction in fluid pressure for effecting an application of the brakes, a magnet, and a valve operated upon deenergization of said magnet for venting fluid from said valve device, of two elements adapted to rotate in synchronism, a plurality of contact segments carried by one element, a plurality of contact segments carried by the other element and each electrically connected to a corresponding segment of the other element, and a contact finger for each element in circuit with said magnet and adapted to engage corresponding contact segments of each element to maintain said circuit closed, so long as said elements rotate in synchronism.

8. In an electric circuit controlling device, the combination with two rotating elements, of a plurality of continuous contact rings carried by each element, a contact finger engaging each ring, each contact finger of one element being connected to a contact finger of the other element, contact segments carried by each element and each connected to a corresponding contact ring, and a contact finger engaging the contact segments of each element and connected to an electric circuit.

In testimony whereof I have hereunto set my hand.

THOMAS H. THOMAS.